United States Patent [19]

Pointout et al.

[11] Patent Number: 4,754,159
[45] Date of Patent: Jun. 28, 1988

[54] ELECTRONICALLY CONTROLLED BATTERY CUT-OFF

[75] Inventors: Jacques Pointout; Philippe Pointout, both of Montlucon, France

[73] Assignee: Etudes et Commercialisation d'Appareils Nouveaux Ecans, France

[21] Appl. No.: 25,035

[22] Filed: Mar. 12, 1987

[51] Int. Cl.⁴ ............................................... H02H 7/18
[52] U.S. Cl. ..................................... 307/9; 307/10 R; 307/10 BP; 340/52 R; 123/146.5 D
[58] Field of Search ................... 307/9, 10 BP, 10 R, 307/10 LS; 340/52 R; 123/146.5 D; 320/29, 30, 31, 32, 33, 34, 48, 40; 180/287

[56] References Cited

U.S. PATENT DOCUMENTS

| | | | |
|---|---|---|---|
| 4,149,093 | 4/1979 | D'Alessio et al. | 307/10 BP |
| 4,176,284 | 11/1979 | Higgs | 307/10 bP |
| 4,270,057 | 5/1981 | Holt | 307/10 R X |
| 4,644,179 | 2/1987 | Pointout et al. | 307/10 BP |

*Primary Examiner*—William M. Shoop, Jr.
*Assistant Examiner*—Paul Ip
*Attorney, Agent, or Firm*—Beveridge, De Grandi & Weilacher

[57] ABSTRACT

A battery cut-off circuit for a vehicle includes a delay circuit which, upon initiation of battery cut-off and opening of the main battery contacts, inhibits re-closing of those contacts for a time sufficient to allow the vehicle alternator circuit contacts to act, thereby avoiding arcing of those contacts.

11 Claims, 4 Drawing Sheets

ELECTRONICALLY CONTROLLED BATTERY CUT-OFF

BACKGROUND OF THE INVENTION

The present invention relates to the battery switches on motor vehicles, particulary trucks used to transport dangerous materials.

The state of the art in this field is particularly illustrated by French Patent No. 2,562,322 in the name of the applicant. In this prior device, an electromagnetic switch with pull and hold coils is mounted under a sealed cover with the control electronics enabling remote control by means of electrical lines carrying a very low current. The movable armature of the electromagnetic device carries the single- or multi-pole main contact parts of the battery circuit. The armature also carries an auxiliary delayed action contact which, during the opening of the main circuit, provides either precontact of the alternator excitation circuit with ground, in the case of an alternator with a built-in regulator, or pre-cutoff of the alternator excitation circuit, in the case of an alternator with an external regulator. However, this mechanically obtained delay is inaccurate and difficult to adjust. The adjustment problems can be detrimental to the excitation diodes of the alternator.

In addition, the auxiliary pre-contact or pre-cutoff contact normally made to switch off a low intensity current risks being destroyed by electrical arcing in the case in which the user, after having closed the control contact, opens it and closes it again within a short period of time, for example, as a result of starting difficulties.

Another operational fault can arise due to a momentarily large voltage drop at the battery. This causes the untimely tripping of the electromagnetic switch and thus prevents the functioning of the vehicle.

SUMMARY OF THE INVENTION

The object of the present invention is to provide the above device, or a similar battery cut-off, with a certain number of refinements for the purpose of eliminating, in particular, the above disadvantages.

An object of a first refinement is to positively prevent any reengagement during a certain period of time after tripping. This period of time is determined so that the intensity of the excitation current has returned to a non-dangerous value.

An object of a second refinement is to provide not only low current in the remote control line or lines, but an absence of permanent current in these lines.

An object of a third refinement is to provide an exact adjustment of the period separating the action of the auxiliary contact from that of the main contact or contacts.

An object of a fourth refinement is to provide protection of the device from any untimely tripping, even in the case of a large voltage drop at the battery.

An object of a fifth refinement is to avoid permanent consumption of current by the coils of the main electromagnetic switch.

The first refinement consists of adding a delay circuit between a control output of the control electronics and an earlier point in the electronics. This ensures, after an initial tripping, the inhibition of any subsequent reengagement action during the time defined by this delay.

The second refinement consists of using two transitory action push-buttons on the dashboard of the vehicle, the pushbuttons being associated with two control lines. These control lines connect to a thyristor or equivalent device which replaces the last transistor preceding the control output, two terminals of the thyristor providing the ignition and switching off respectively.

The third refinement consists of replacing the mechanically controlled auxiliary contact with an independent relay, separate or incorporated in the device and electronically controlled.

The fourth refinement consists of controlling the transistor which controls the pull winding with a second transistor. This second transistor is controlled by the charging current of a capacitor from the control output. The fourth refinement also consists of controlling the transistor which controls the hold winding directly from this control output.

Finally, the fifth refinement consists of removing the hold winding of the electromagnetic switch and replacing it with an electromagnetic lock. In its rest position, the electromagntic lock locks the armature of the electromagnetic device in its working position. It remains this way even if the absence of current in the pull winding, as the electronic wiring is consequently modified.

BRIEF DESCRIPTION OF THE DRAWINGS

Other features of the invention will become apparent in the description of various embodiments which follow, taken as examples and shown in the appended drawings. In the drawings.

DETAILED DESCRIPTION OF PREFERRED EMBODIMENTS

Figure 1:
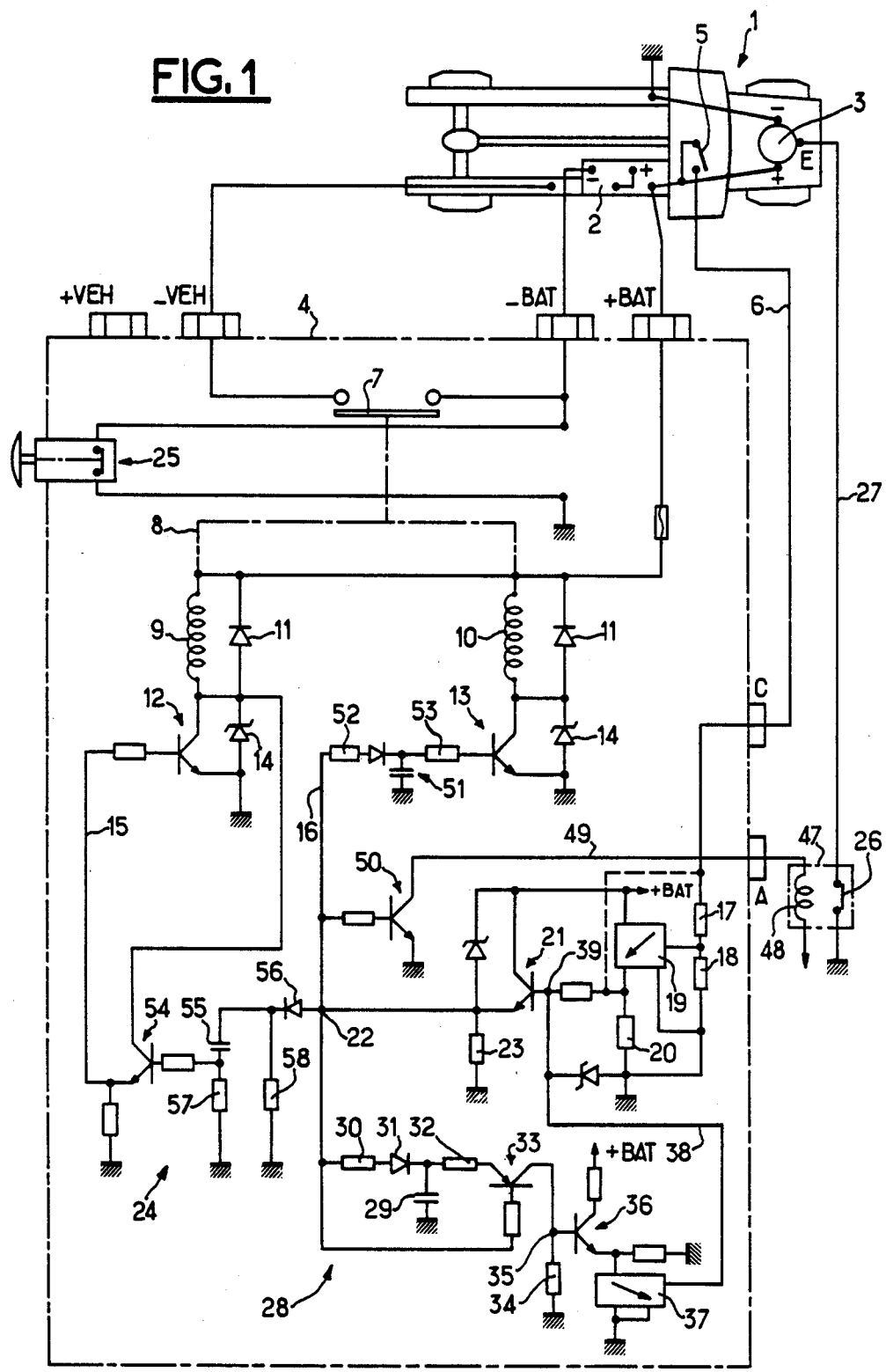
FIG. 1 shows the circuit diagram of a first embodiment with a single control line.

FIG. 1 shows a diagrammatic representation of a vehicle 1 with a battery 2 and an alternator 3. Battery cut-off or main switch 4, itself also naturally on the vehicle, includes four terminals +VEH, −VEH, −BAT, and +BAT. These terminals can be connected to the + and − terminals of the vehicle and the − and + terminals of the battery, respectively. Certain of these terminals may be omitted or not connected, according to the electrical installation circuit diagram used by the vehicle manufacturer. Battery cut-off 4 is remotely controlled from a main contact 5 on the vehicle dashboard through a remote control line 6, connected to an input terminal C of battery main switch 4.

As for the prior battery cut-off referred to above, one or two main contact bars 7 are provided, depending on whether the battery cut-off is a single- or double-pole. For purposes of simplification, only one of these bars is shown in FIG. 1. This bar or these bars 7 are mechanically controlled, as represented diagrammatically at 8, by an electromagnetic device including a double winding in the form of a pull winding 9 and a hold winding 10. Each winding 9, 10 includes, in a conventional manner, a diode 11 to shunt impulse currents and a control transistor. Thus control transistor 12 for coil 9 and control transistor 13 for coil 10 connect to ground the circuit powered from the +BAT. Transistors 12 and 13 each have a shunt connected protective Zener diode 14. Pull line 15, when positively biased, makes transistor 12 conducting and powers pull coil 9. Hold line 16 similarly controls the powering of hold coil 10.

In addition, control input C, connected to the remote control line 6, is connected to ground through two resistors 17, 18 whose junction is connected to the input of a optical coupler 19. The output of optical coupler 19 connects the +BAT source to a bias resistor 20 which controls the base of an output transistor 21. Output transistor 21 is also provided with a protective Zener diode and biases, when the control 6 is active, a control output 22 with an unbiasing resistor 23. Through a monostable multivibrator 24, unbiasing resistor 23 controls the biasing of pull line 15 for a specified time. In contrast, hold line 16 is powered continuously for example, as shown in FIG. 1, directly from control output 22. A local emergency stop switch 25 is provided to open the grounding of battery cut-off circuit 4 and consequently deactivate the battery cut-off.

In addition to the + and − terminals of its main circuit, alternator 3 includes an excitation terminal E. Depending on the type of alternator, terminal E can be connected to ground a certain time before the opening of bar 7 for alternators with incorporated regulators known as precontact or D+ alternators. If that is not the case, then terminal E must be cut off from ground a certain time before the opening of the bar 7 for alternators with external regulators called excitation pre-cutoff alternators. This function is provided by an auxiliary contact 26 connected to excitation terminal E by a line 27. Hence, auxiliary contact 26 must be actuated, depending on the type of alternator, to close or to open before the opening of main contact 7.

As described above, when control contact 5 is opened at the vehicle dashboard, in the case of pre-contact alternators, auxiliary contact 26, which is intended to protect the excitation diodes, closes. The circuit therefore carries a high transient current which greatly exceeds the cutoff capability of auxiliary contact 26. Thus, if the drive remakes the contact 5 a very short time after it has been broken, i.e. at a time insufficient for the transient current to have dropped back to a non-dangerous level, destruction can be caused by electrical arcing of the auxiliary contact 26. There is a particular risk of this phenomenon occurring in cases of starting difficulties.

To avoid this, device 4 is provided with a delay circuit 28 which, for any negative transition of control output 22, applies to the base of remote control output transistor 21 a voltage cutting off this transistor for a time determined by this delay.

In FIG. 1, delay circuit 28 includes a capacitor 29 that is charged from a control output 22 through a resistor 30 and a diode 31 and that is discharged to ground through a resistor 32, a transistor 33, and another resistor 34. Transistor 33 is itself controlled directly from control output 22. Junction 35, between transistor 33 and resistor 34, controls a transistor 36. In turn, transistor 36 controls the input of an optical coupler 37 whose output causes the grounding of an inhibit line 38 connected at junction 39 to the control base of the remote control output transistor 21.

In the quiescent state, i.e. when capacitor 29 is discharged, transistor 36 is cut off so that inhibit line 38 is not connected to ground. When control contact 5 is closed for the first time, control output 22 is brought to the high level by means of remote control lines 15 and 16 and resistor 23. Consequently, capacitor 29 charges through resistor 30 and diode 31.

During a first opening of contact 5, control output 22 is brought to zero potential which makes transistor 33 conduct and thus grounds inhibit line 38 for the time necessary to discharge capacitor 29 through resistor 32, transistor 33, and resistor 34. Throughout this time, point 39 is held at zero potential even if the user immediately closes contact 5 again. It is only after the delay necessary for the return of the excitation current to normal that the remote control can again operate, thus protecting the auxiliary contact 26.

When vehicle 1 is used for transporting dangerous materials, safety standards require that remote control line 6 carry a current of less than 20 mA. The electronic remote control mentioned enables this current to be lowered to a value much lower than that imposed by the standards. However, it is possible according to this invention to go even further by arranging that no permanent current flows in control line 6. To achieve this, the alternative embodiment shown in FIG. 2 can be used, in which a transitory action push-button 40, intended to bring the battery into service, has been inserted between dashboard contact 5 and remote control line 6. At the same time, another push-button 41, also a transitory action push-button and intended to disconnect the battery, is connected by an additional interrupt line 42 to an additional interrupt terminal I on battery cut-off 4.

All that has been described previously with respect to the first embodiment remains valid, except that output transistor 21 of the remote control is replaced by a thyristor 43 whose gate 44 is controlled by optical coupler 19 and whose drain 45 is connected to control output 22. Also in this case, point 39 of inhibit line 38 is connected to the source side of thyristor 43. This point is normally biased by a resistor 46 and also forms the end point of interrupt line 42.

In this way, when contact 5 is closed, no current flows in control line 6 so long as start button 40 has not been pressed. This then produces, through gate 44, the switching on of thyristor 43. Everything functions as previously described, even after button 40 has been relased, except that from this time onwards no further current flows in line 6. Conversely, in order to cut off the battery, the user must press button 41 which momentarily grounds point 39. This switches off thyristor 43, which naturally remains off after the release of this button despite the bias resistor 46. Inhibit line 38 acts as in the previous example by holding point 39 at ground for the desired period in order to prevent thyristor 43 from switching on again.

Figure 2:
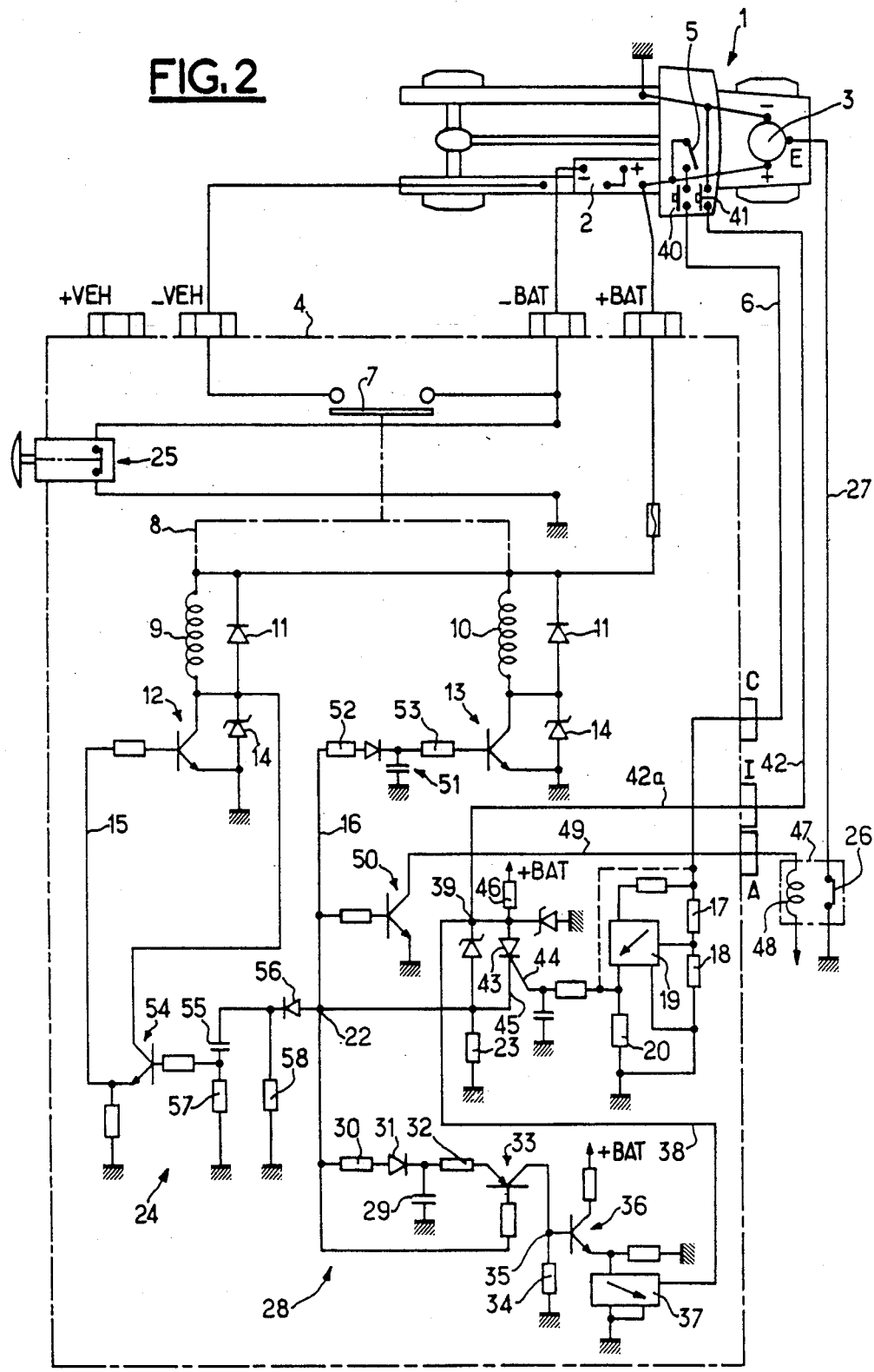
FIG. 2 shows the circuit diagram of a second embodiment with a double control line.

In the first embodiment example, just as in the second example, if the vehicle is not intended for the transport of dangerous materials, part of the remote control electronics can be removed and replaced by a shunt represented in broken lines in FIGS. 1 and 2, just as in the embodiment described in the previously mentioned prior patent.

Figure 3:
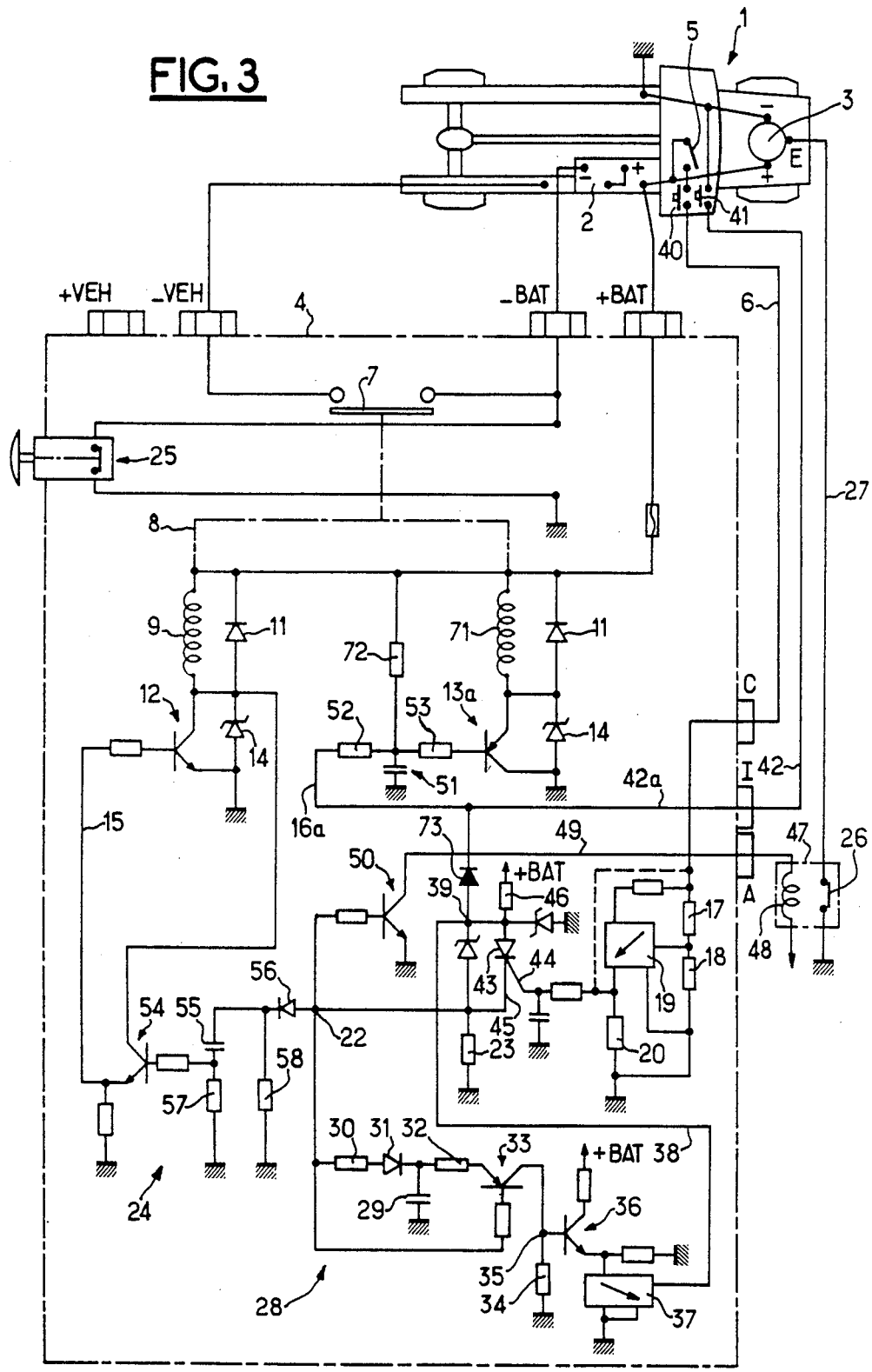
FIG. 3 shows the circuit diagram of a third embodiment.

The advantage of being able to very accurately adjust the period separating the closing or opening of auxiliary contact 26 and the opening of main circuit 7 has been described above. The purpose is to avoid manufacturing spreads due to tolerances and to adapt to the various alternator types used. In order to do this the invention provides for replacing the mechanically controlled auxiliary contact 26, actuated by windings 9 and 10, with an independent electromagnetic relay 47 which includes its own winding 48. Relay 47 can be separate from battery cut-off 4 so that it can be placed, for example, near alternator 3 and connected by a terminal A, or relay 47 can be incorporated into battery cut-off 4. In the most frequent case of an alternator with pre-contact, relay 47 is of the normally closed type, as shown in FIGS. 1 to 3, and opens when winding 48 is energized. Conversely, in the pre-cutout alternator, relay 47 is of the normally open type which closes as a result of excitation of winding 48.

The electronic control of relay 47 is provided by a line 49 form a transistor 50 whose base is directly controlled from control output 22. Also, a capacitor 51 is shunt connected between bias resistors 52 and 53 of hold line 16. In this way, in one or other of the embodiments in FIGS. 1 and 2, when control output 22 goes to zero potential on an interrupt request, transistor 50 immediately switches over and instantaneously produces the cutoff of the excitation to winding 48 of auxiliary contact 26. At the same time, hold coil 10 continues to receive current for the time required for the discharge of capacitor 51, which has been charged during the previous closing of the main circuit. A relatively accurate and easily adjustable delay is therefore obtained by choosing the values of the components.

As previously seen, there is an advantage in making the battery cut-off able to engage and remain engaged even if the supply voltage suffers a large and sudden drop. In order to do this, pull transistor 12 is controlled by pull line 15 from another transistor 54 which is itself controlled by the charging current of a capacitor 55 from control output 22 through a diode 56. The charging current biases a charging resistor 57, while a discharge resistor 58 ensures the discharge of capacitor 55 when control output 22 is at zero.

In this way, when control output 22 goes to the high level for the entire duration of the charging of capacitor 55, transistor 54 is conducting and therefore both controls transistor 12 and supplies pull coil 9. This supply stops when capacitor 55 is sufficiently charged. Only hold coil 10 remains powered by transistor 13, which is controlled from control output 22 as described.

From all of the above, it follows that when the vehicle is stopped, the ignition is switched off, and the battery cut-off switched off, no current passes through any of the three windings 9, 10, and 48. On the other hand, while the vehicle is functioning and the battery circuit is established, coils 10 and 48 are permanently powered. This is a disadvantage, particularly in the embodiment shown in FIG. 2 where the drive can forget to press interrupt contact 41 and thus cause his battery to discharge.

Figure 4:
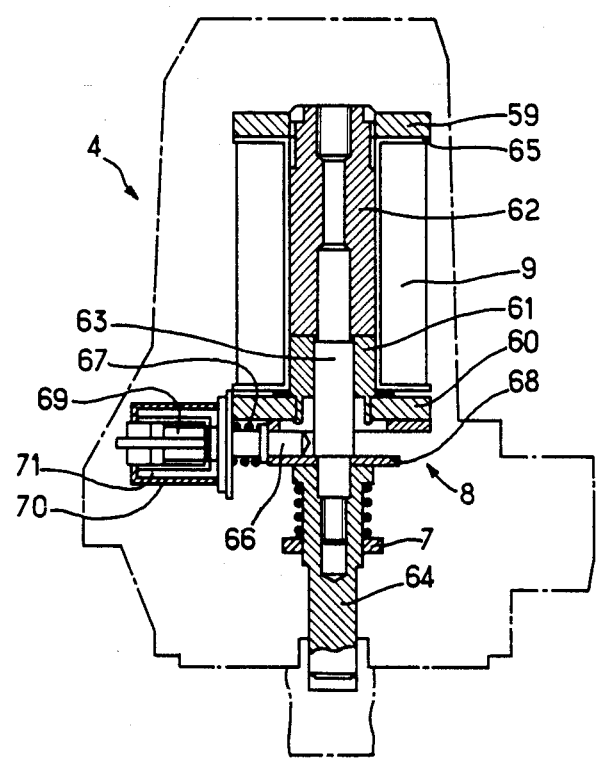
FIG. 4 is an axial cross-sectional view of the electromagnetic device corresponding with this third embodiment.

According to the invention, permanent current to hold winding 10 can be avoided by modifying the electromagnetic control device of bar 7 or of the contact bars of the main circuit in the way shown in FIG. 4.

FIG. 4 shows the main static magnetic circuit 59, 60, 61, with its plunger core 62 fixed to the sliding rod 63. Sliding rod 63 drives, by means of part 64, the contact bar 7, or a part which drives bar 7 in its turn. Coil 65 is an insulating coil on which the pull winding 9 and hold winding 10 assembly is normally wound. In the present case, winding 10 is removed, and coil 65 consequently only includes winding 9, providing the pull of plunger core 62 downwards in FIG. 4 to the position shown in the figure.

In order to keep moving parts 62-63-64 in the pull position without requiring the consumption of current, an electromagnetic lock is used. The electromagnetic lock is formed by a lock rod 66 pushed by a spring 67 in the direction of rod 63 in order to act on a washer 68 fixed between rod 63 and part 64. In its turn, lock rod 66 is fixed to the moving parts 69 of another electromagnet 70 fitted with a return winding 71.

When winding 71 is energized, rod 66 retracts and allows the moving assembly to rise to the upper position of FIG. 4 under the effect of a return spring (not shown). The end of rod 66 then presses on the periphery of washer 68. The main moving assembly remains in this normal rest position even when the supply to return winding 71 is switched off.

Conversely, when pull winding 9 is energized, the main moving assembly descends and releases rod 67 which takes up the locking position shown in FIG. 4 under the effect of its return spring 67. The main moving assembly therefore remains in its working position even after the powering of pull winding 9 is cut off. Instead of controlling windings 9 and 10, windings 9 and 71 have to be controlled instead. However, both windings 9 and 71 are controlled by means of short duration actions, thus avoiding any permanent consumption of current.

The control of return coil 71 can be generally carried out using a transition detection device combined with an action delay followed by a hold delay.

This embodiment proves to be particularly simple when use is made of the two transistory control buttons 40 and 41 on the dashboard, as depicted in second embodiment example of FIG. 2. FIG. 3 shows the adaptation of the circuit diagram necessary to solve the problem of control of return winding 71 which is inserted in place of hold winding 10 of FIGS. 1 and 2. NPN transistor 13 with grounded emitter is replaced by a PNP transistor 13a with the emitter on the source side. Hold line 16 in this case becomes a return line 16a which, when it is biased, causes transistor 13a to cut off and, when it is grounded, makes transistor 13a conduct. The base of transistor 13a is no longer connected to control output 22, but instead is connected to internal line 42a which is a continuation of interrupt line 42 from interrupt terminal I. Also, the common point between resistors 52 and 53 is biased by an additional resistor 72, and a diode 73 is preferably placed in the other branch of 42a which leads to point 39 in order to isolate the two parts of the circuit.

In the quiescent state, line 16a is therefore biased and transistor 13a is cut off so that no current passes through return coil 71. When button 40 is pressed, after having closed contact 5, the momentary functioning of pull winding 9 is produced in exactly the same way as before, without exerting any action on return winding 71. By means of the device of FIG. 4, this is sufficient for mechanically locking the main moving assembly in its working position.

On the other hand, when interrupt button 41 is pressed, delay circuit 28 is activated in the same way as before. In addition, both the control of auxiliary contact 26 by transistor 50 and simultaneously the grounding of line 16a take place. Capacitor 51, which is then charged, discharges through resistor 52 and produces the required delay between the pre-contact or the pre-cutoff by auxiliary contact 26 and the opening of main circuit 7. When capacitor 51 is sufficiently discharged to ground, transistor 13a becomes conductive, thus activating return winding 71. When button 41 is finally released, capacitor 51 recharges through resistor 72 and again interrupts the power supply to return winding 71. Therefore, the last refinement mentioned necessitates only a small modification of the circuit diagram in order to change from FIG. 2 to FIG. 3.

We claim:

1. A battery cut-off circuit for a vehicle having a battery with a main battery circuit and an alternator with an excitation circuit, said cut-off circuit comprising:
    a main contact adapted to be connected in the main battery circuit for control of the battery;
    an electromagnetic control device having first and second control windings for controlling said main contact;
    an electronic control circuit including a control output terminal; an output unit for applying voltage to said control output terminal, said output unit having an input terminal; first and second control transistors responsive to the voltage level on said control output terminal for controlling said first and second control windings, respectively; and circuit means adapted for connection in the vehicle for applying a negative voltage transition to said control output terminal to initiate cut-off of the vehicle battery; and
    a delay circuit responsive to negative voltage transitions on said control output terminal for biasing said output unit input terminal to cause said output unit to maintain said control output terminal at substantially the voltage level of the negative voltage transition for at least a predetermined time,
    whereby, upon initiation of cut-off of the vehicle battery, said main contact is opened to cut off the battery and re-closing of said main contact is prevented for at least the predetermined time.

2. A battery cut-off circuit as claimed in claim 1 wherein said delay circuit comprises:
    a capacitor coupled to said control output terminal for charging of said capacitor when said control output terminal is at the voltage level to which said first and second transistors are responsive to actuate said first and second control windings, closing said main contact to complete the battery circuit;
    a third transistor connected when conductive to maintain said output unit input terminal at substantially the voltage level of the negative voltage transition;
    a fourth transistor connected to discharge said capacitor through a path providing a capacitor discharge time of the predetermined time and biasing said third transistor to conduct for such time; and
    means coupling said fourth transistor to said control output terminal for biasing said fourth transistor to conduct in response to the negative voltage transition on said control output terminal.

3. A battery cut-off circuit as claimed in claim 1 wherein said output unit comprises a further transistor connected when conductive to apply voltage from the vehicle battery to said control output terminal, an optical coupler connected when conductive to bias said further transistor into conduction, and switching means connected to said further transistor and said optical coupler and adapted for connection to the vehicle battery for selectively applying battery voltage to make said optical coupler conductive.

4. A battery cut-off circuit as claimed in claim 1 wherein said circuit means of said electronic control circuit comprises transitory switching means for controlling application of voltage to said output unit input terminal to control application of negative voltage transitions to said control output terminal.

5. A battery cut-off circuit as claimed in claim 4 wherein said output unit comprises a thyristor having a gate adapted for connection to one terminal of said transitory switching means, source adapted for connection another terminal of said transitory switching means, and a drain connected to said control output terminal for applying voltage thereto when said thyristor is conductive, said transitory switching means controlling conduction of said thyristor.

6. A battery cut-off circuit as claimed in claim 1 further comprising a capacitor connected to be charged by voltage on said control output terminal and another transistor connected to cause said first transistor to actuate said first control winding during the time said capacitor is charging.

7. A battery cut-off circuit as claimed in claim 6 wherein said components are selected to permit operation thereof with low battery voltage.

8. A battery cut-off circuit as claimed in "claim" 1 further compressing an auxiliary contact circuit adapted for connection in the alternator excitation circuit and including contact means capable of assuming alternatively a first position conecting the alternator excitation circuit to ground and a second position isolating the alternator excitation circuit from ground, said alterntor contact circuit including means responsive to negative voltage transitions on said control output terminal for causing said contact means to assume the second position.

9. A battery cut-off circuit as claimed in claim 8 wherein said auxiliary contact circuit contact means comprises contacts of a relay, and said auxiliary circuit controlling means comprises the coil of said relay, an additional transistor coupling said relay coil to said control output terminal, and a capacitor, for delaying the response of said first and second transistors to negative voltage transitions on said control output terminal for a time sufficient to allow said relay contacts to open, isolating the alternator excitation circuit from ground.

10. A battery cut-off circuit for a vehicle having a battery with a main battery circuit and an alternator with an excitation circuit, said cut-off circuit comprising:
    a main contact adapted to be connected in the main battery circuit for control of the battery;
    an electromagnetic control device having first and second control windings for controlling said main contact;
    an electronic control circuit including a control output terminal; an output unit for applying voltage to said control output terminal, said output unit having an input terminal; transitory switching means adapted for connection in the vehicle for controlling application of voltage to said output unit input terminal to control application of negative voltage transitions to said control output terminal; an main moving assembly having a sliding rod and a first spring normally biasing said sliding rod to a rest position in which said main contact is open, said sliding rod responsive to current in said first control winding to move against the bias of said first spring to a working position in which said sliding rod closes said main contact; a transverse moving assembly having a lock rod and a second spring normally biasing said lock rod to a locking position, said lock rod responsive to current in said second control winding to move against the bias of said second spring to an unlocking position in which said sliding rod is free to move in response to bias of said first spring and current in said first control winding, said lock rod in the locking position cooperating with said sliding rod in the working position to lock said sliding rod in the working position even in the absence of current in said first control winding; a first control transistor responsive to the voltage level on said control output terminal for controlling said first control winding; and a second control transistor coupled to said transitory switching means for controlling said second output terminal in response to selected activation of said transitory switching means; and a delay circuit responsive to negative voltage transitions on said control output terminal for biasing said output unit input terminal to cause said output unit to maintain said control output terminal at substantially the voltage level of the negative voltage transition for at least a predetermined time, whereby, upon initiation of cut-off of the vehicle battery, said main contact is opened to cut off the battery and re-closing of said main contact is prevented for at least the predetermined time.

11. A battery cut-off circuit as claimed in claim 10 further comprising an auxiliary contact circuit adapted for connection in the alternator excitation circuit and including contact means capable of assuming alternatively a first position connecting the alternator excitation circuit to ground and a second position isolating the alternator excitation circuit from ground, said auxiliary contact circuit including means responsive to negative voltage transitions on said control output terminal for causing said contact means to assume the second position.

* * * * *